Patented Feb. 3, 1953

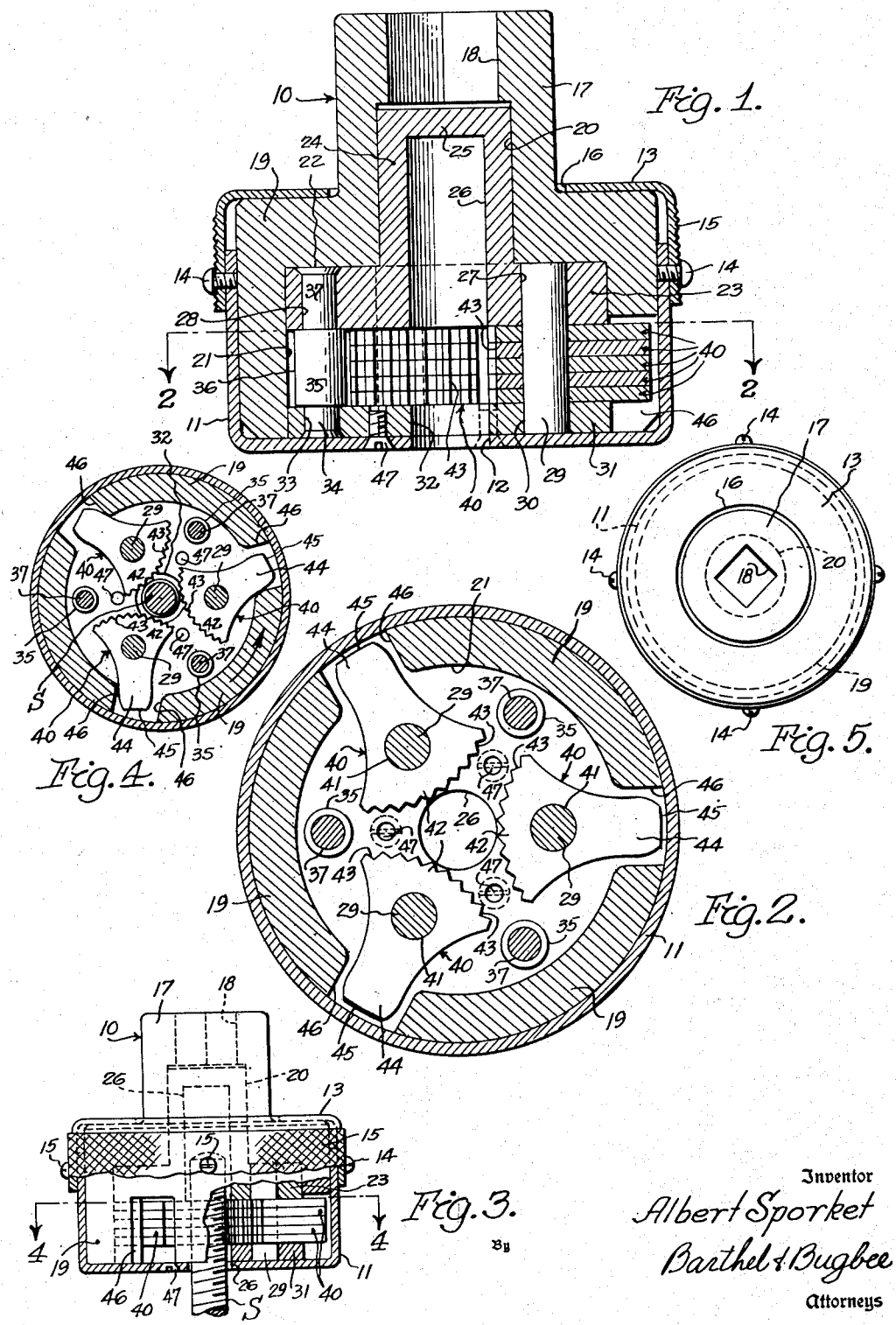

2,627,195

UNITED STATES PATENT OFFICE 2,627,195

STUD REMOVER

Albert Sporket, Detroit, Mich.

Application February 21, 1950, Serial No. 145,543

1 Claim. (Cl. 81—53)

This invention relates to stud removers.

Hitherto, the removal of studs has been a frequently troublesome operation requiring much time and labor and occasionally very difficult where the stud has become "frozen" or rusted or otherwise tightly secured in its bore. A stud is a rod which is threaded at its opposite ends with an unthreaded portion between the threaded portions. One end of the stud is threaded into the machine in which it is used and the other end is left projecting free for the attachment of nuts to secure a part thereto, such as a cover plate, cylinder head or the like. The threads of such studs frequently become worn or damaged so as to require their removal. The present invention renders such removal rapid and easy, in that the more resistance which the stud offers to its removal, the tighter becomes the grip with which the device engages the stud.

One object of the invention is to provide a stud remover of simple and compact design which is strong enough to remove tightly seated studs quickly and easily with a minimum of effort.

Another object is to provide a stud remover which grips the shank of the stud at several spaced locations around its periphery and grips the stud with a grasp which increases with the resistance offered by the stud to its removal.

Another object is to provide a stud remover which will tightly grip a stud even though its shank has become deformed so as to vary in diameter at different portions thereof.

In the drawings:

Figure 1 is a central vertical section through a stud remover, according to one form of the invention, with the stud-gripping cam jaws in their central non-gripping positions;

Figure 2 is a horizontal section taken along the line 2—2 in Figure 1;

Figure 3 is a side elevation of the stud remover shown in Figures 1 and 2, showing the device in position for removing a stud, with the view partly broken away to show the position of the internal moving parts;

Figure 4 is a view similar to Figure 2, but showing the gripping jaws in their gripping positions, the view being taken along the line 4—4 in Figure 3; and Figure 5 is a top plan view of the stud remover shown in Figures 1 to 4 inclusive.

Referring to the drawings in detail, Figures 1 and 2 show a stud remover, generally designated 10, according to one form of the invention as including a cup-shaped casing 11 with a central aperture 12 for receiving the stud and with an upper annular cup-shaped holding and retaining member 13 secured as by the screws 14 to the cup-shaped casing 11, the holding member 13 having an annular knurled portion 15 which provides a roughened surface adapted to be gripped between the palm and fingers of the hand without slippage. The annular holding member 13 is provided with a central opening 16 through which projects a hollow outer stem 17 having a bore or socket 18 of square or other suitable cross-section for receiving a socket wrench or hand lever (not shown). The stem 17 projects upward from a hollow cylindrical housing 19 which is likewise cup-shaped having an upper bore 20 and a lower enlarged bore or counterbore 21 with an annular shoulder 22 between the bores 20 and 21 (Figure 1).

Mounted in the enlarged bore 21 of the housing 19 is a head 23 having a hollow stem 24 fitting into the bore 20 and journaled therein so as to be rotatable relatively to the housing 19. The hollow inner stem 24 is closed at its top by an end wall 25, thereby providing a recess or socket 26 for receiving the stud to be removed.

The head 23 is provided with circumferentially-spaced alternating bores 27 and 28 arranged at intervals around its periphery. Mounted in the bores 27 are pivot pins 29, the lower ends of which are received in similarly located bores 30 in a retaining disc 31 having a central aperture 32 of substantially the same size as the aperture 12 and bore 26 and aligned therewith. The retaining ring 31 is also provided with bores 33 aligned with the bores 28 and receiving the lower end portions 34 of spacing fasteners 35 having enlarged diameter portions 36 located in the middle thereof and a reduced diameter portion 37 located at the upper end thereof. In this manner, an annular shoulder is formed between the central enlarged portion 36 and each of the reduced diameter portions 34 and 37 so as to positively and precisely space the retaining disc 31 away from the head 23. The free ends of the reduced diameter portions 34 and 37 are enlarged, rivet-like, in order to retain the parts in assembly, the upper ends of the bores 28 and the lower ends of the bores 33 being flared for this purpose.

Pivotally mounted on each pivot pin 29 is a plurality of roughly sector-shaped cam jaws 40 having holes 41 therein for receiving the pivot pins 29. The cam jaws have widened arcuate inner ends 42 with teeth 43 thereon and have narrowed arms 44 terminating in rounded outer ends 45. The arcuate inner ends 42 on which the teeth 43 are formed are not centered on the axes of the pivot pins 29 but their centers are located between the pivot pins 29 and the rounded outer ends 45 of the arms 44 (Figure 2). The purpose of this arrangement is to insure a gripping action as described in connection with the operation. The outer ends of the arms 45 are inserted in radial notches 46 which are somewhat wider than the arms 44 in order to permit loose and free play of the ends 45 therein as the casing 19 and head 23 are rotated relatively to one another. The casing 11 is mechanically connected to the head 23 by screws 47 threaded through the bottom wall thereof into the retaining disc 31.

In the operation of the invention, let it be assumed that a socket wrench handle has been inserted in the square hole 18 in the outer stem 17 and that the stem 17 is rotated while the annular holding member 13 is held stationary by being grasped in one hand of the operator, thereby swinging the gripping jaws 40 into their central positions where their long axes pass through the center of the recess 26 (Figure 2). In this position, the arcuate toothed jaw ends 43 are outside the limits of the socket 26, so that they cannot contact a stud S (Figure 2). The device is now lowered onto the stud S to be removed, permitting the stud to enter the socket 26. Grasping the knurled portion 15 of the holding member 13 with one hand, the operator now rotates the stem 17 and housing 19 with the socket wrench handle in the other hand, this relative rotation of the housing 19 and head 23 causing the cam jaws 40 to swing around their pivot pins 29 (Figure 4), bringing their arcuate toothed inner ends 42 into biting engagement with the stud S (Figures 3 and 4). Further turning of the wrench or hand lever inserted in the socket 18 in the direction of withdrawal of a stud causes the stud to be quickly and easily unscrewed from its threaded hole, slippage of the stud being prevented by the gripping action of the cam jaws 40. The multiplicity of cam jaws 40 on each pivot pin 29 (Figures 1 and 3) insures that the stud will be tightly gripped, regardless of irregularities in its diameter such as might be caused by wear or damage, and a tapered stud may thus be easily removed. The cam jaws 40 cannot slip relatively to the stud S because of the fact that the toothed arcuate ends 42 have their centers located outwardly of the pivot pins 29 so as to bring about a swinging of the teeth 42 into the socket space 26, as shown by a comparison of Figures 2 and 4.

What I claim is:

A stud remover comprising a cylindrical head having a central stem projecting upwardly therefrom and having a wrench-receiving portion thereon, said head having a cylindrical cavity therein and a central reduced diameter bore extending upwardly therefrom into said stem, a cylindrical jaw carrier rotatably mounted in said cavity and having an upwardly-projecting central shaft portion journalled in said bore, said shaft portion having a central stud-receiving socket therein, a plurality of pivot elements mounted in circumferentially-spaced relationship on said jaw carrier in locations spaced outwardly from said socket, a stud-gripping jaw pivotally mounted on each pivot element, each jaw having a serrated portion on its inner end engageable with the stud to be removed and a lever arm on its outer end operatively connected to said head, and a hollow cylindrical casing enclosing said head, said casing having a centrally-apertured bottom wall connected to said jaw carrier, a side wall encircling the side wall of said head, and a centrally-apertured top wall extending over the top of said head, said stem projecting upwardly through the central aperture of said top wall.

ALBERT SPORKET.

REFERENCES CITED

The following references are of record in the file of this patent:

UNITED STATES PATENTS

| Number | Name | Date |
|---|---|---|
| 651,306 | Gabriel | June 5, 1900 |
| 1,140,567 | Boring | May 25, 1915 |
| 2,486,494 | Rice | Nov. 1, 1949 |
| 2,516,394 | Keiser | July 25, 1950 |
| 2,541,605 | Ohlsson | Feb. 13, 1951 |

FOREIGN PATENTS

| Number | Country | Date |
|---|---|---|
| 636,996 | France | Jan. 23, 1928 |
| 39,434 | France (Addition to No. 636,996) | Aug. 11, 1931 |
| 506,848 | Great Britain | June 2, 1939 |
| 565,376 | Great Britain | Nov. 8, 1944 |